United States Patent
Cerina et al.

(10) Patent No.: US 12,514,460 B2
(45) Date of Patent: Jan. 6, 2026

(54) DETERMINING A HEART RATE OF A SUBJECT

(71) Applicant: KONINKLIJKE PHILIPS N.V., Eindhoven (NL)

(72) Inventors: Luca Cerina, Eindhoven (NL); Pedro Miguel Ferreira dos Santos da Fonseca, Eindhoven (NL); Rik Vullings, Eindhoven (NL); Sebastiaan Overeem, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 517 days.

(21) Appl. No.: 18/075,762

(22) Filed: Dec. 6, 2022

(65) Prior Publication Data
US 2023/0233093 A1 Jul. 27, 2023

Related U.S. Application Data

(60) Provisional application No. 63/412,068, filed on Sep. 30, 2022, provisional application No. 63/301,912, filed on Jan. 21, 2022.

(51) Int. Cl.
*A61B 5/00* (2006.01)
*A61B 5/024* (2006.01)

(52) U.S. Cl.
CPC ............ *A61B 5/024* (2013.01); *A61B 5/4812* (2013.01); *A61B 5/4818* (2013.01); *A61B 5/725* (2013.01); *A61B 2562/0247* (2013.01)

(58) Field of Classification Search
CPC ..... A61B 5/024; A61B 5/4812; A61B 5/4818; A61B 5/725
See application file for complete search history.

(56) References Cited

U.S. PATENT DOCUMENTS

| | | | |
|---|---|---|---|
| 6,445,942 B1 | 9/2002 | Berthon-Jones | |
| 7,035,684 B2 | 4/2006 | Lee | |

(Continued)

OTHER PUBLICATIONS

Meslier, N. et al., "Validation of a suprasternal pressure transducer for apnea classification during sleep". (2002). Sleep, vol. 25, No. 7.
(Continued)

*Primary Examiner* — Daniel L Cerioni
(74) *Attorney, Agent, or Firm* — Daniel H. Brean

(57) ABSTRACT

According to an aspect, there is provided a computer-implemented method for determining a heart rate of a subject, the method comprising: receiving data representing a signal generated by a pressure sensor configured to be placed on a suprasternal notch of a subject, the data representing a first component of the signal comprising respiratory information associated with the subject and/or a second component of the signal comprising cardiac information associated with the subject; determining, by applying a first algorithm to the data, a respiration parameter of the subject; applying at least one filter to the data to obtain first filtered data, the at least one filter comprising a first filter to attenuate the first component of the signal in the data based on the determined respiration parameter; and determining a heart rate of the subject by applying a second algorithm to the first filtered data.

11 Claims, 4 Drawing Sheets

(56) References Cited

U.S. PATENT DOCUMENTS

| | | | |
|---|---|---|---|
| 2011/0208009 A1* | 8/2011 | Fu | A61B 5/024 600/300 |
| 2014/0008161 A1 | 1/2014 | Cox | |
| 2019/0090756 A1* | 3/2019 | Lu | A61B 5/7275 |
| 2019/0183414 A1* | 6/2019 | Ferreira dos Santos da Fonseca | A61B 5/352 |
| 2021/0228135 A1 | 7/2021 | Freycenon | |
| 2021/0298623 A1 | 9/2021 | Syed | |
| 2023/0062311 A1* | 3/2023 | Chen | G16H 50/20 |

OTHER PUBLICATIONS

Glos, M. et al., "Characterization of Respiratory Events in Obstructive Sleep Apnea Using Suprasternal Pressure Monitoring". Journal of Clinical Sleep Medicine, vol. 14, No. 3 (2018), p. 359.

Penzel, T. et al., "The use of tracheal sounds for the diagnosis of sleep apnea". Breathe, Jun. 2017, vol. 13, No. 2.

Dehkordi, P. et al., "Validation of respiratory signal derived from suprasternal notch acceleration for sleep apnea detection". 2011 Annual International Conference of the IEEE Engineering in Medicine and Biology Society, 2011, pp. 3824-3827, doi: 10.1109/IEMBS.2011.6090950.

Singh, S. et al., "Proof of Concept of a Novel Neck-Situated Wearable PPG System for Continuous Physiological Monitoring". IEEE Transactions on Instrumentation and Measurement, vol. 70 (2021).

International Search Report for PCT/EP2023/051043 filed Jan. 18, 2023.

Freycenon, N. et al., "Estimation of Heart Rate From Tracheal Sound Recorded for the Sleep Apnea Syndrome Diagnosis", IEEE Transactions on Biomedical Engineering, IEEE. USA, vol. 68, No. 10, (Feb. 24, 2021) pp. 3039-3047.

Chen, G. et al., "Algorithm for heart rate extraction in a novel wearable acoustic sensor", Healthcare Technology Letters, The Institution of Engineering and Technology, UK, vol. 2, No. 1, (Feb. 1, 2015), pp. 28-33.

Morillo, D.S. et al., "Monitoring and Analysis of Cardio Respiratory and Snoring Signals by using an Accelerometer",2007 Annual International Conference of the IEEE Engineering in Medicine and Biology Society, France, (Aug. 22, 2007), pp. 3942-3945.

Zhu, X. et al., "Automatic home care system for monitoring HR/RR during sleep", Engineering in Medicine and Biology Society, 2008. (Aug. 20, 2008), pp. 522-525.

* cited by examiner

DETERMINING A HEART RATE OF A SUBJECT

CROSS-REFERENCE TO RELATED APPLICATIONS

This patent application claims the priority benefit under 35 U.S.C. § 119(e) of U.S. Provisional Application No. 63/301,912, filed on Jan. 21, 2022, and Provisional Application No. 63/412,068, filed on Sep. 30, 2022, the contents of which are herein incorporated by reference.

FIELD OF THE INVENTION

The invention relates to a method, apparatus and system for determining a heart rate of a subject and, more particularly, determining a heart rate of a subject based on received data.

BACKGROUND OF THE INVENTION

Sleep apnea is a widespread disease but identifying subjects with sleep apnea remains burdensome and complex since a subject will typically be required to undergo a night in a specialized sleep clinic with many sensors attached to their body to generate a polysomnogram from which sleep apnea may be identified. Accurately quantifying parameters associated with a subject's respiratory processes is an important step when identifying sleep apnea. However, current sensors used to measure respiratory processes of a subject can be uncomfortable and/or invasive, difficult to place properly, and can be poorly tolerated, or simply not accepted, by the subject undergoing polysomnography, thereby complicating an already burdensome process. For instance, oesophageal pressure sensors are difficult to place, are poorly accepted by subjects, and if a subject moves during a sleep session, the sensors cannot be placed again in the correct position, which could invalidate the results of the entire sleep session.

A suprasternal notch pressure sensor greatly simplifies measurements of respiratory processes because its placement is easier. However, current suprasternal notch pressure sensors typically employ microphones configured to operate in the human hearing, or audio, range (e.g., using a sampling rate in excess of 44.1 kHz) to detect breathing sounds, thus requiring higher computing power and/or specialized processors, such as a DSP, in order to process the data generated. Furthermore, recording data in the audio range implies privacy constraints on voices that may be detected by the microphone.

Currently, both in clinical practice and home-sleep testing, two or more sensors are required to track both respiratory processes (e.g., respiratory effort) and cardiac processes (e.g., cardiac signals), which can require a degree of know-how on the part of the subject (e.g., how to place sensors correctly), and requires that the signals from each sensor be synchronized.

SUMMARY OF THE INVENTION

A suprasternal notch pressure sensor may be used to detect suprasternal pressure of a subject, which may be indicative of pressure swings happening in the subject's trachea and which, in turn, may be representative of upper airway dynamics and possible obstructions. Owing to the position of a suprasternal notch pressure sensor and its sampling frequency (e.g., 1024 Hz), signals generated by the sensor may comprise both a respiratory component (e.g., information relating to respiratory processes of a subject, such as a breathing rate, respiratory effort, or the like) and a cardiac component (e.g., information relating to cardiac processes of a subject, such as cardiac oscillations that can be caused by pressure waves in the blood vessels of the subject's neck). The pressure sensor may also comprise a component indicative of vibrations connected to snoring sounds (e.g., ~320 Hz). The cardiac component is currently discarded as an artifact rather than a source of useful information.

It is an aim of the present invention to make use of the cardiac component of the signal. Correct tracking of cardiac processes, or heart dynamics (e.g., average heart rate, pulse rate variability, or the like) can allow for better denoising of the respiratory component of the signal while allowing estimation of dynamics (e.g., airway dynamics, cardio-respiratory dynamics, and the like) using a single sensor instead of multiple sensors, which may be advantageous, for example, in home sleep monitoring scenarios.

According to a first specific aspect, there is provided a computer-implemented method for determining a heart rate of a subject is provided. The method comprises receiving data representing a signal generated by a pressure sensor configured to be placed on a suprasternal notch of a subject, the data representing a first component of the signal comprising respiratory information associated with the subject and/or a second component of the signal comprising cardiac information associated with the subject; determining, by applying a first algorithm to the data, a respiration parameter of the subject; applying at least one filter to the data to obtain first filtered data, the at least one filter comprising a first filter to attenuate the first component of the signal in the data based on the determined respiration parameter; and determining a heart rate of the subject by applying a second algorithm to the first filtered data.

In some embodiments, the method may further comprise generating, based on the determined heart rate, a control signal to be delivered to a recipient device.

Applying at least one filter may, in some embodiments, further comprise applying a second filter to attenuate components of the signal having frequencies within a defined frequency range corresponding to powerline interference and/or snoring.

In some embodiments, determining a heart rate of the subject may comprise generating a plurality of frames from the first filtered data, each of the plurality of frames comprising a subset of the first filtered data; applying the second algorithm to the first filtered data in each of the plurality of frames such that a heart rate is determined for each of the plurality of frames; and determining a first average heart rate based on the plurality of heart rates.

The method may, in some embodiments, further comprise determining a parameter associated with the plurality of heart rates indicative of a quality of the plurality of heart rates;

determining, based on the parameter, a value indicative of a quality of each of the plurality of determined heart rates in the plurality of heart rates; applying a third filter to the plurality of heart rates to remove heart rates with a quality value below a quality threshold; and determining a second average heart rate based on the filtered plurality of heart rates.

In some embodiments, the method may further comprise determining a sleep parameter relating to sleep of the subject and/or a sleep stage of the subject based on the first filtered data and/or the determined heart rate of the subject.

The method may, in some embodiments, further comprise applying a fourth filter to the received data to attenuate the second component of the signal in the received data based on the determined heart rate to obtain second filtered data; and determining, based on the second filtered data, whether the subject experienced a sleep disturbance.

In some embodiments, the method may further comprise applying a fourth filter to the received data to attenuate the second component of the signal in the received data based on the determined heart rate to obtain second filtered data; and determining a sleep parameter relating to sleep of the subject and/or a sleep stage of the subject based on the second filtered data.

The method may, in some embodiments, further comprise identifying, based on the second filtered data, a sleep disordered breathing event indicative of a central apnea, an obstructive sleep apnea, or hypopnea.

In some embodiments, the method may further comprise receiving second sensor data comprising respiratory information, cardiac information or movement information associated with the subject; and determining, based on the first filtered data and the second sensor data, a sleep stage of the subject.

The method may, in some embodiments, further comprise receiving motion data representing a signal generated by a second sensor configured to measure a motion of the subject; wherein applying at least one filter to the received data to obtain first filtered data may further comprise applying a fifth filter to attenuate or disregard components of the signal corresponding to motion of the subject above a defined motion threshold, based on the motion data.

According to a second aspect, a computer program product is provided, the computer program product comprising a non-transitory computer readable medium, the computer readable medium having computer readable code embodied therein, the computer readable code being configured such that, on execution by a suitable computer or processor, the computer or processor is caused to perform the method of any of the preceding claims.

According to a third aspect, an apparatus for determining a heart rate of a subject is provided, the apparatus comprising a processor configured to perform steps of the methods 100 described herein.

According to a fourth aspect, a system for determining a heart rate of a subject is provided, the system comprising an apparatus as described herein; and a pressure sensor configured to be placed on a suprasternal notch of a subject.

In some embodiments, the system may further comprise a component configured to transfer data generated by the pressure sensor to a processor.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
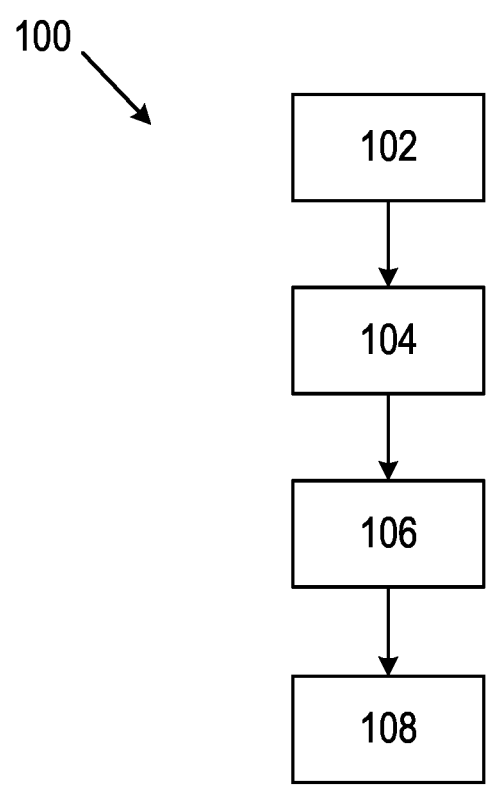
FIG. 1 is a flowchart of an example of a method for determining a heart rate of a subject.
Figure 2:
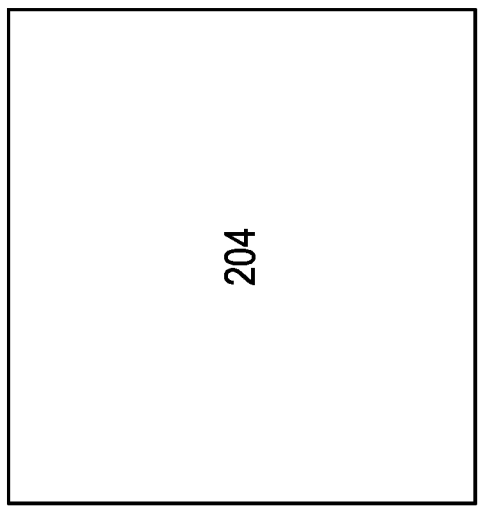
FIG. 2 is a schematic illustration of a processor in communication with a non-transitory computer readable medium.
Figure 2:
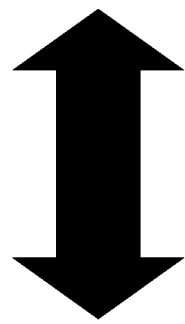
Figure 2:
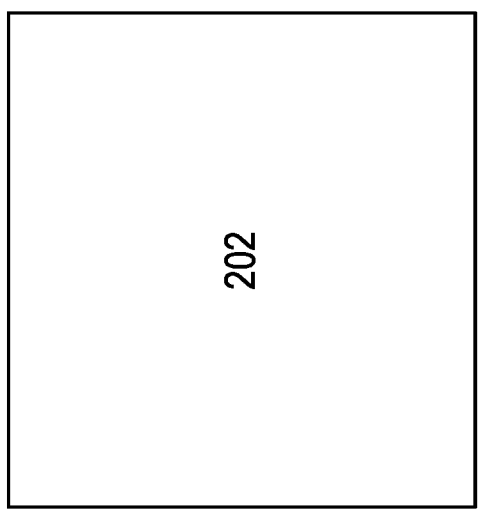
Figure 3:
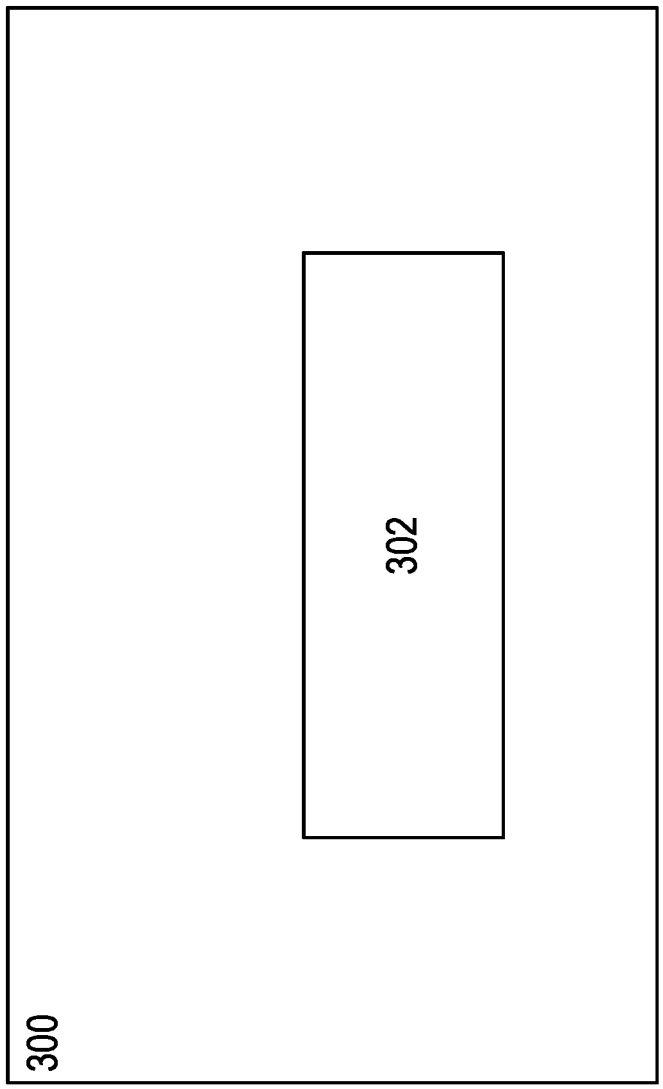
FIG. 3 is a schematic illustration of an example of an apparatus for determining a heart rate of a subject.
Figure 4:
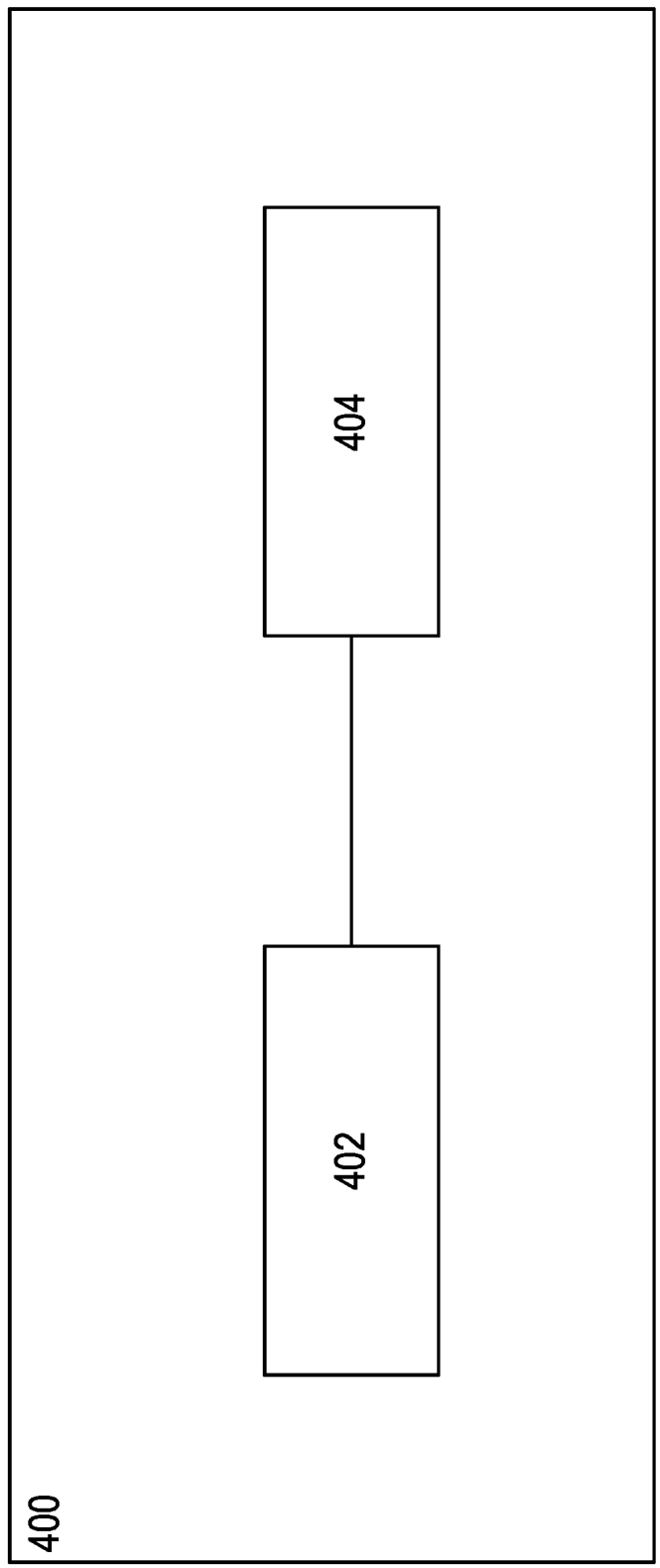
FIG. 4 is a schematic illustration of an example of a system for determining a heart rate of a subject.

A suprasternal notch pressure sensor may allow synchronized detection of cardiac processes and respiratory processes associated with a subject using a single sensor, which may be beneficial for sleep analysis (e.g., if accurate detection of heart interbeat intervals (IBIs) is determined). The synchronization (or desynchronization) between heartbeats and respiration is an important indicator of autonomic nervous system dynamics, which can have ramifications on an analysis of sleep stages, sleep disordered breathing and other chronic diseases associated with the autonomic system (e.g., nocturnal hypertension, diabetes, and the like).

Currently, respiratory effort, airflow and cardiac signals are analyzed separately (e.g., for the diagnosis of sleep disordered breathing). Current methods for suprasternal notch pressure sensor signal analysis typically rely on removing the cardiac component with a notch filter with fixed frequency. This method may fail to remove the cardiac component, particularly if the heart rate is outside the filter bandwidth, such that spurious components may remain in the signal. Correct heart rate tracking may improve the quality of the signal, which subsequently allows a clean respiratory effort signal (e.g., with the cardiac component removed) to be input into automatic systems (e.g., machine learning methods) to correctly identify respiratory events.

According to a first aspect, a computer-implemented method 100 for determining a heart rate of a subject is provided. The method 100 comprises, at step 102, receiving data representing a signal generated by a pressure sensor configured to be placed on a suprasternal notch of a subject, the data representing a first component of the signal comprising respiratory information associated with the subject and/or a second component of the signal comprising cardiac information associated with the subject. The data may be received from a sensor directly (e.g., in real time or from a memory of the sensor) or from a memory (e.g., from a memory of a computer, from a server located in the cloud, or the like). Respiratory information may comprise a respiration rate, respiratory effort, or the like. Cardiac information may comprise a heart rate, an interbeat interval, heart rate variability, or the like.

The method comprises, at step 104, determining, by applying a first algorithm to the data, a respiration parameter of the subject. The first algorithm may comprise frequency spectrum estimation, an autocorrelation function, peak detection, a discrete Fourier transform, or the like. The first algorithm may be applied at an expected time period. In other words, the first algorithm may be applied between a first, lower, frequency (e.g., 0.1 Hz) and a second, upper, frequency (e.g., 0.7 Hz). The lower and upper frequencies may be chosen such that they encompass a respiration rate of the subject and do not encompass a heart rate of the subject. In this case, frequencies of the signal outside of the range defined by the first frequency and the second frequency may be dismissed for the purposes of step 104 of method 100 comprising determining a respiration parameter of the subject. The chosen frequency range may be updated in an iterative process if it is determined that the frequency range does not include the respiration rate and/or includes the heart rate. A respiration parameter may be a breathing rate, or the like.

The method comprises, at step 106, applying at least one filter to the data to obtain first filtered data, the at least one filter comprising a first filter to attenuate the first component of the signal in the data based on the determined respiration parameter. The first filter may be a high pass filter, or the like. The first filter may be a function of the respiration parameter. For example, the respiration parameter may comprise a respiration rate determined, or extracted, from peaks of spectral power, from peaks in the time domain, or the like, such that the first filter may be tuned to cover a range of values encompassing, or around, the respiration rate. In some examples, applying at least one filter may further comprise applying a second filter (e.g., a band stop filter) to attenuate components of the signal having frequencies within a defined frequency range corresponding to powerline interference (e.g., 40 to 50 Hz, 50 to 60 Hz, 60 to 70 Hz, or the like) and/or snoring (e.g., 280 to 300 Hz, 300 to 320 Hz, 320 to 350 Hz, or the like). Powerline interference may be present for mains powered devices. Powerline interference may not be present, or be insignificant, for battery powered devices. The second filter may be applied before, or after, the first filter. In some examples, the second filter may be applied to the received data prior to the step of determining 104 a respiration parameter of the subject by applying a first algorithm to the data.

The method comprises, at step 108, determining a heart rate of the subject by applying a second algorithm to the first filtered data. The second algorithm may comprise an autocorrelation function. In some examples, the second algorithm applied to the first filtered data to determine a heart rate of a subject may comprise an algorithm that is configured to determine: maxima points in the frequency domain (e.g., spectral or cepstral), frequency coefficients from audio methods (e.g., Mel-frequency cepstral coefficients (MFCC)), wavelet representations of the signal, time domain templates, or the like. In some examples, the second algorithm may comprise a time domain analysis comprising (i) local peak (e.g., maxima or trough), inflection or derivative zero-crossing detection, (ii) template matching based on an expected signal shape which may correspond to individual heart beats, (iii) or the like. Algorithms (i) and/or (ii) may be used, or configured, to determine a distance between consecutive peaks and, from an average over an analysis window in the time domain, to determine an average rate (e.g., heart rate). Each example of the second algorithm may be associated with an advantage (e.g., may determine a heart rate of the subject more accurately, may be able to better account for a certain type of noise in the data, or the like). Applying an autocorrelation function to the first filtered data may reveal temporal relationships in a time-series of that data. Applying an autocorrelation function to the first filtered data may result in multiple peaks at different frequencies. A priori information may be used to narrow down where a peak corresponding to the heart rate of a subject may be in the autocorrelation data. For example, a heart rate of a subject may be determined by determining a frequency corresponding to a maximum point in a peak of the autocorrelation data within a pre-set frequency range (e.g., 0.7 Hz to 1.8 Hz, or the like). If there is more than one peak within the pre-set frequency range in the autocorrelation data, the peak with the largest amplitude may be chosen as representative of a heart rate of the subject. Wavelet analysis may reduce issues associated with the trade-off between frequency resolution and time resolution.

The step of determining 108 a heart rate of the subject may comprise generating a plurality of frames from the first filtered data, each of the plurality of frames comprising a subset of the first filtered data; applying the second algorithm to the first filtered data in each of the plurality of frames such that a heart rate is determined for each of the plurality of frames; and determining a first average heart rate based on the plurality of heart rates. In other words, the received data may be analyzed in set time intervals (e.g., frames). Put differently, the received data may be broken down into 10 second segments, 15 second segments, 20 second segments, or the like. A segment may be referred to as a frame. The sizes of the frames may be the same (e.g., each frame may comprise a time window of 10 seconds) or may be different (e.g., a first frame may comprise a time window of 10 seconds and a second frame may comprise a time window of 15 seconds). A duration of the frames (e.g., 10 seconds) may be based on a time window in which it is expected that a subject's heart rate remains relatively stable. Each frame of the received data may then be processed. For example, the second algorithm may be applied to each frame, such that a heart rate of the subject is determined for each frame. In some examples, a first frame may comprise data from 0 to 9 seconds inclusive, a second frame may comprise data from 10 to 19 seconds inclusive, and the like. In some examples, the frames analyzed may overlap. For instance, a first frame may contain data from 0 to 9 seconds inclusive, a second frame may contain data from 1 to 10 seconds inclusive, and the like. In some examples, the frames may overlap by 75%. Using overlapping frames may help to reduce noise in the data and/or smooth the data.

In some examples, each frame may be broken down into sub-frames (e.g., 20 sub-frames, 50 sub-frames, or the like). For instance, if the suprasternal notch pressure sensor is recording data at 1024 Hz and a 10 second frame is analyzed, the 10 second frame will contain 10240 measurements. Recording, or sampling, pressure sensor data at 1024 Hz (compared to, for example, a value in the range 4 kHz to 44 kHz) requires less computing power and it is less likely to record identifiable voices. In this example, if the 10 second frame is broken down into 20 equally sized sub-frames, each sub-frame will contain 512 measurements. In some examples, the sub-frames may overlap. For instance, a first sub-frame may comprise the zeroth measurement to the $511^{th}$ measurement inclusive, a second sub-frame may comprise the $10^{th}$ measurement to the $521^{st}$ measurement inclusive, and the like. In some examples, the received data may divided into sub-frames directly (e.g., without first dividing the received data into frames). For lower heart rates, an autocorrelation function may require more data to characterize the heart rate because the corresponding peak in the autocorrelation function may change relatively slowly over time. For higher heart rates, an autocorrelation function may require relatively fewer data. Higher heart rates may require a higher overlap to better observe rapid variations.

An advantage of using overlapping frames, or overlapping sub-frames, is that a heart rate may be determined for each frame, or sub-frame, such that individual frames, or sub-frames, may be removed if they are determined to contain an artefact, noise above a threshold level, or the like. Removing frames, or sub-frames, comprising noisy data may help to improve the accuracy with which an overall (e.g., an average) heart rate is determined.

An average heart rate may be determined using a plurality of heart rates, the plurality of heart rates each corresponding to one or a plurality of frames (or sub-frames) using, for example, the following equation:

$$\hat{HR} \sim \mathcal{N}\left(\frac{1}{N}\sum_{i=0}^{N}\hat{F0}(i), \sigma^2\right) + \gamma_1,$$

where $\hat{HR}$ is the average heart rate of the plurality of heart rates, $\mathcal{N}$ indicates that the distribution in brackets is normalized, N is the number of frames, or sub-frames, used, $\hat{F0}$ is the estimated heart rate a frame (or sub-frame), $\sigma^2$ is a variance associated with the plurality of heart rates and $\gamma_1$ is a skewness associated with the plurality of heart rates (e.g., caused by noisier frames or short heart rate spikes).

The second algorithm (e.g., an autocorrelation function) may be applied to the data in each frame or to the data in each sub-frame.

The pre-set frequency range, in which a peak corresponding to a heart rate is determined for a given frame, may be determined based on a previous frame. For example, maxima points in an autocorrelation of the data for a given frame may be identified within a frequency range 0.7 Hz to 1.5 times the heart rate in the previous window (e.g., the previous frame). The previous frame may be the frame immediately preceding the given frame, in terms of time. In some examples, the pre-set frequency range may be determined based on multiple earlier frames. For the first frame, or the first several frames (e.g., 5 frames, 10 frames, or the like), a wider pre-set frequency may be used (e.g., 0.7 Hz to 1.8 Hz, or the like).

In some embodiments, the method 100 may comprise, at step 110, generating, based on the determined heart rate, a control signal to be delivered to a recipient device. A recipient device may comprise a display, a piece of medical equipment (e.g., a breathing apparatus), or the like. For example, a signal may comprise instructions to cause a display to display a determined heart rate of a subject.

The method 100 may comprise determining a parameter associated with the plurality of heart rates indicative of a quality of the plurality of heart rates. The parameter indicative of a quality of the plurality of heart rates may comprise a parameter indicative of a homogeneity of the plurality of heart rates. For example, widely distributed or increasing/decreasing estimates may be indicative of a noisy signal and/or respiratory events (e.g., respiratory events that have not been, or only partly, filtered out). In some examples, the parameter indicative of a quality of the plurality of heart rates may comprise the interquartile range of the plurality of heart rates, a first, or lower, quartile of the plurality of heart rates, a third, or upper, quartile of the plurality of heart rates, or the like. In some examples, the parameter indicative of a quality of the plurality of heart rates may comprise two or more values. For example, the parameter may comprise a first value and second value comprising:

$$P_{lower} = Q1 - 1.5*IQR \text{ if } \gamma_1 < 0$$

$$P_{upper} = Q3 + 1.5*IQR \text{ if } \gamma_1 > 0$$

where $P_{lower}$ is a first value of the parameter, Q1 is the first quartile of the plurality of heart rates, IQR is the interquartile range of the plurality of heart rates, $P_{upper}$ is a second value of the parameter, Q3 is the third quartile of the plurality of heart rates and $\gamma_1$ is a skewness associated with the plurality of heart rates.

The method 100 may comprise determining, based on the parameter associated with the plurality of heart rates indicative of a quality of the plurality of heart rates, a value indicative of a quality of each of the plurality of determined heart rates in the plurality of heart rates. For example, each of the plurality of heart rates may be compared to the parameter indicative of a quality of the plurality of heart rates. In some examples, if a heart rate of the plurality of heart rates is above the parameter indicative of a quality of the plurality of heart rates, then the heart rate may be determined to be of a high quality. If a heart rate is determined to be equal to, or below, the parameter indicative of a quality of the plurality of heart rates, then the heart rate may be determined to be of a low quality. In some examples, a heart rate may be determined to be of a high quality if it falls between two of the values of the parameter indicative of a quality of the plurality of heart rates. For example, if a heart rate falls within the range $P_{lower}$ to $P_{upper}$, then it may be determined to be of a high quality.

The method 100 may comprise applying a third filter to the plurality of heart rates to remove heart rates with a quality value below a quality threshold. For example, if a heart rate is determined to be of a low quality, then it may be removed from the plurality of determined heart rates. The third filter may therefore remove anomalous data (e.g., heart rates). Anomalous data may be referred to as an outlier. The method 100 may comprise determining a second average heart rate based on the filtered plurality of heart rates.

In some examples, a band-pass filter (e.g., a finite impulse response band-pass filter, an infinite impulse response band-pass filter, or the like) may be applied to the received data, or the first filtered data, to detect, or determine, cardiac information (e.g., heart rate information). The cardiac information determined using a band-pass filter may be stored (e.g., for later use). For example, a band-pass filter with a bandwidth encompassing the determined heart rate may be used. In some examples, a band-pass filter with a bandwidth encompassing both the determined heart rate and its higher harmonics (e.g., up to the fourth harmonic) may be used. In some examples, quasi-periodic signal peaks may be detected in the filtered signal (e.g., the band-pass filtered signal) and/or stored for later analysis (e.g., for beat-by-beat analyses). The filtered signal may be referred to as the filtered cardiac signal. Peak detection may be performed using a variety of methods, including, for example, searching for local maxima in the filtered cardiac signal. The methods used for peak detection may enforce rules specifying a physiologically plausible distance between consecutive heart beats. In some examples, template matching may be used to search for beats of an expected shape (e.g., signal shape). In some examples, singularity detection based on continuous wavelet decomposition may be used. Based on these methods of peak detection, a refined band-pass filter (e.g., a filter bank) tuned to the heart rate (e.g., instantaneous heart rate, average heart rate within a window, or the like) may be used to clean the cardiac influence on the respiration signal (e.g., as described herein). This information may be used, for example, to clean the signal from cardiac noise.

In some embodiments, unwanted cardiac components may be removed from the signal by using a band-stop filter. For example, a band-stop filter may be applied with a bandwidth encompassing the determined heart rate and/or its higher harmonics.

The method 100 may comprise determining a sleep parameter relating to sleep of the subject and/or a sleep stage of the subject based on the first filtered data and/or the determined heart rate of the subject. In some examples, the first filtered data may be used to quantify autonomic components during sleep, accelerations or decelerations caused by respiratory events or arousals, non-dipping heart rate profiles indicative of cardiac stress, and the like. The first filtered data may be used to detect changes in heart rate (e.g., during sleep onset), pulse rate variability, and the like. Identification of changes in heart rate (e.g., specific slow changes to heart rate) may be used to identify sleep onset and wake-up, changes in sleep staging during a sleep session (e.g., during the course of a night) such as periods of wakefulness, light sleep, deep sleep, or the like. Pulse rate variability patterns and/or indexes may be used to identify a subject's sleep stages.

The method 100 may comprise applying a fourth filter to the received data to attenuate the second component of the signal in the received data based on the determined heart rate to obtain second filtered data; and determining, based on the second filtered data, whether the subject experienced a sleep disturbance. In some examples, the second filter of the at least one filter may be applied to the received data to attenuate components of the signal having frequencies within a defined frequency range corresponding to power-line interference and/or snoring prior to the fourth filter being applied to the received data. In other words, the second filter of the at least one filter may be applied to the received data, and the fourth filter may be applied to the data resulting from the second filter being applied to the received data. In some examples, determining whether the subject experienced a sleep disturbance may be based on the first filtered data, or both the first filtered data and the second filtered data.

The method 100 may comprise applying a fourth filter to the received data to attenuate the second component of the signal in the received data based on the determined heart rate to obtain second filtered data; and determining a sleep parameter relating to sleep of the subject and/or a sleep stage of the subject based on the second filtered data.

The method 100 may comprise identifying, based on the second filtered data, a sleep disordered breathing event indicative of a central apnea, an obstructive sleep apnea, or hypopnea. The method may, in some embodiments, further comprise identifying, based on the second filtered data, a sleep disordered breathing event indicative of, for example, a central apnea, an obstructive sleep apnea, or hypopnea. In some examples, the signal cleaned of the cardiac component (e.g., the second filtered data) may be used to differentiate between upper airway respiratory mechanisms and thoracic or abdominal respiratory mechanisms. This information may, in turn, be used to identify and/or differentiate between central apneas, mixed apneas, obstructive apneas and hypopneas. In some examples, a parameter relating to sleep (e.g., current sleep stage, or the like) may be determined using a combination of the second filtered data and a respiratory signal and/or cardiac signal from another sensor (e.g., respiratory belt measurements, nasal airflow measurements, ECG measurements, PPG measurements or the like).

The method 100 may further comprise receiving second sensor data comprising respiratory information, cardiac information or movement information associated with the subject; and determining, based on the first filtered data and the second sensor data, a sleep stage of the subject. For example, a second sensor may comprise an accelerometer, an inertial measurement unit, an electrocardiogram device, an electroencephalogram device, a flow rate sensor (e.g., located on a nasal canula), a thoracic electrocardiogram, a wrist photoplethysmography sensor, or the like. The second sensor (e.g., an accelerometer) may be used to identify unexpected movements in the suprasternal notch pressure sensor. For example, spikes in the pressure sensor data generated from a subject touching the pressure sensor while they are sleeping may hamper the quality of the pressure sensor signal. The pressure sensor signal may be filtered to remove, or attenuate, these spikes from the data, or to simply disregard that portion of the data.

Using data from a suprasternal notch pressure sensor and a second sensor may lead to better characterization of breathing disturbances. The cardiac signal extracted from the suprasternal notch pressure sensor may be used in conjunction with ECG and/or PPG sensors. For example, ECG data may provide information relating to how the heart is beating and PPG data may provide an information relating to peripheral dynamics of arteries of a subject, while the cardiac signal from a suprasternal notch pressure sensor may provide information relating to dynamics of pulmonary arteries.

In some examples, a cardiac signal extracted from the suprasternal notch pressure sensor signal may be used to identify the position of heartbeats. An electrocardiogram sensor (e.g., located on a subject's thorax) may be used to identify the position of heartbeats. The two heartbeat time series (e.g., determined using the suprasternal notch pressure sensor signal and the electrocardiogram sensor signal) may be aligned in time. A time interval from a beat determined from the electrocardiogram signal to a beat determined from the suprasternal notch pressure sensor signal may be defined, or referred to, as the pulse transit time (PTT). The PTT signal may be representative of blood pressure dynamics. The suprasternal notch pressure sensor signal cleaned of the cardiac component may be used to enrich PTT signal information to quantify if the PTT signal may be used reliably to characterize blood pressure dynamics in a subject.

The method 100 may further comprise receiving motion data representing a signal generated by a second sensor configured to measure a motion of the subject; wherein applying at least one filter to the received data to obtain first filtered data further comprises applying a fifth filter to attenuate or disregard components of the signal corresponding to motion of the subject above a defined motion threshold, based on the motion data.

In some examples, a suprasternal notch pressure sensor may be used by a subject at home or in clinical setting, which may be used in conjunction with other physiological measurements. A raw pressure signal with an upper bandwidth of >300 Hz (or >250 Hz, 350 Hz, or the like) may be used to detect tracheal noise which may, in turn, be correlated with illness (e.g., COPD, asthma, or the like) severity. The pressure sensor signal cleaned of the cardiac component may be used to estimate respiratory effort and/or to detect obstructions, abnormal airflow respiration shapes, respiration rhythm, or the like. The pressure sensor signal cleaned of the cardiac component may be used during, or after, administration of a therapeutic device (e.g., an asthma inhaler) to quantify how upper airway dynamics change in response to the administration of the therapeutic device. The cardiac component of the pressure sensor signal may be used to detect cardiac stress caused by a respiratory illness.

In some examples, the invention described herein may be used by a subject at home or in sport facilities. The suprasternal notch pressure sensor signal cleaned of the cardiac component may be used to track if a user is synchronized to target breathing cycles. The cardiac signal extracted from the suprasternal notch pressure sensor may be used to track if the user is inside a target heart rate range and/or if controlled breathing is reducing their heart rate.

According to a second aspect, a computer program product is provided. The computer program product comprises a non-transitory computer readable medium 204, the computer readable medium having computer readable code embodied therein, the computer readable code being configured such that, on execution by a suitable computer or processor 202, the computer or processor is caused to perform steps of the methods disclosed herein.

According to a third aspect, an apparatus 300 for determining a heart rate of a subject is provided. The apparatus 300 comprises a processor 302 configured to perform steps of the methods 100 described herein. In some examples, the apparatus 300 (e.g., the processor 302) may be configured to record and/or transmit pressure sensor data to an external device (e.g., a smartphone, the Internet, the cloud, or the like). In some examples, the apparatus 300 may be connected wirelessly to a second apparatus, such as a smartphone. The second apparatus may comprise an application to provide visual and/or acoustic indications to a user (e.g., a user of a controlled breathing cycle). The apparatus 300 and/or the second apparatus may be connected wirelessly to a third apparatus (e.g., lights), for example, to provide a visual indication of a controlled breathing cycle.

According to a fourth aspect, a system 400 for determining a heart rate of a subject is provided. The system 400 comprises an apparatus 402 as disclosed herein; and a pressure sensor 404 configured to be placed on a suprasternal notch of a subject. The pressure sensor may be a suprasternal notch pressure sensor. The pressure sensor may be configured to sample (e.g., record pressure measurements) at a frequency of 1024 Hz, or the like. A resolution up to 24 bits may be used, or the like. The pressure sensor may be configured to form an airtight connection (e.g., seal) to the skin of a subject, which may improve the accuracy and/or quality of the pressure data obtained. Such a connection may be achieved using clinical grade adhesives. A quality of the sensor signal may be checked based on polysomnography data.

The system 400 may further comprise a component configured to transfer data generated by the pressure sensor to a processor.

The processor 202, 302 can comprise one or more processors, processing units, multi-core processors or modules that are configured or programmed to control the apparatus 300 in the manner described herein. In particular implementations, the processor 202, 302 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for determining a heart rate of a subject, the method comprising:
   receiving data representing a signal generated by a pressure sensor placed on a suprasternal notch of a subject, the data representing a first component of the signal comprising respiratory information associated with the subject and a second component of the signal comprising cardiac information associated with the subject;
   determining, by applying a first algorithm to the data, a respiration parameter of the subject;
   applying at least one filter to the data to obtain first filtered data, the at least one filter comprising a first attenuation filter to attenuate the first component of the signal in the data based on the determined respiration parameter;

determining a heart rate of the subject by applying a second algorithm to the first filtered data, applying second attenuation filter to the received data to attenuate the second component of the signal in the received data based on the determined heart rate to obtain second filtered data; and determining, based on the second filtered data, at least one of i) a sleep parameter relating to sleep of the subject, or a sleep stage of the subject, ii) a sleep disordered breathing event indicative of a central apnea, an obstructive sleep apnea, or hypopnea, and iii) whether the subject experienced a sleep disturbance.

2. The method of claim 1, further comprising:

generating, based on the determined heart rate, a control signal to be delivered to a recipient device.

3. A method according to claim 1, wherein applying at least one filter further comprises applying a frequency range filter to attenuate components of the signal having frequencies within a defined frequency range corresponding to powerline interference and/or snoring.

4. A method according to claim 1, wherein determining a heart rate of the subject comprises:

generating a plurality of frames from the first filtered data, each of the plurality of frames comprising a subset of the first filtered data;

applying the second algorithm to the first filtered data in each of the plurality of frames such that a heart rate is determined for each of the plurality of frames; and determining a first average heart rate based on the plurality of heart rates.

5. A method according to claim 4, further comprising:

determining a parameter associated with the plurality of heart rates indicative of a quality of the plurality of heart rates;

determining, based on the parameter, a value indicative of a quality of each of the plurality of determined heart rates in the plurality of heart rates;

applying a heart rate filter to the plurality of heart rates to remove heart rates with a quality value below a quality threshold; and determining a second average heart rate based on the filtered plurality of heart rates.

6. A method according to claim 1, further comprising:

determining the sleep disturbance based on both the first filtered data and the second filtered data.

7. A method according to claim 1, further comprising:

receiving second sensor data comprising respiratory information, cardiac information or movement information associated with the subject; and determining, based on the first filtered data and the second sensor data, a sleep stage of the subject.

8. A method according to claim 1, further comprising:

receiving motion data representing a signal generated by a second sensor configured to measure a motion of the subject;

wherein applying at least one filter to the received data to obtain first filtered data further comprises applying a motion filter to attenuate or disregard components of the signal corresponding to motion of the subject above a defined motion threshold, based on the motion data.

9. A computer program product comprising a non-transitory computer readable medium, the computer readable medium having computer readable code embodied therein, the computer readable code being configured such that, on execution by a suitable computer or processor, the computer or processor is caused to perform the method of claim 1.

10. An apparatus for determining a heart rate of a subject, the apparatus comprising:

a processor configured to perform the method of claim 1.

11. A system for determining a heart rate of a subject, the system comprising:

an apparatus according to claim 10; and a pressure sensor configured to be placed on a suprasternal notch of a subject.

* * * * *